(12) United States Patent
Kristensen et al.

(10) Patent No.: US 6,658,186 B1
(45) Date of Patent: Dec. 2, 2003

(54) CABLE ARRANGEMENT

(75) Inventors: Rune Kristensen, Hokksund (NO); Eivind Nesset, Asker (NO)

(73) Assignee: ABB Kraft AS, Drammen (NO)

( * ) Notice: Subject to any disclaimer, the term of this patent is extended or adjusted under 35 U.S.C. 154(b) by 0 days.

(21) Appl. No.: 09/856,081

(22) PCT Filed: Nov. 29, 1999

(86) PCT No.: PCT/NO99/00357
§ 371 (c)(1),
(2), (4) Date: Oct. 4, 2001

(87) PCT Pub. No.: WO00/33323
PCT Pub. Date: Jun. 8, 2000

(30) Foreign Application Priority Data

Nov. 30, 1998 (NO) ............................................. 19985601

(51) Int. Cl.[7] ................................................. G02B 6/44
(52) U.S. Cl. ........................................ 385/110; 385/113
(58) Field of Search ................................. 385/100–114

(56) References Cited

U.S. PATENT DOCUMENTS

| | | | | |
|---|---|---|---|---|
| 5,495,546 A | * | 2/1996 | Bottoms et al. | 385/101 |
| 6,067,394 A | * | 5/2000 | Ruello et al. | 385/106 |
| 6,355,879 B1 | * | 3/2002 | Bertini et al. | 174/47 |

FOREIGN PATENT DOCUMENTS

| | | |
|---|---|---|
| CN | 1077304 | 10/1993 |
| GB | 2144879 | 3/1985 |
| GB | 2159978 | 12/1985 |
| JP | 10115741 | 5/1998 |

* cited by examiner

Primary Examiner—Hemang Sanghavi
Assistant Examiner—Scott Knauss
(74) Attorney, Agent, or Firm—Volpe and Koenig, P.C.

(57) ABSTRACT

The present invention relates to a cable, particularly for monitoring and/or controlling oil/gas wells, comprising a protective tube (6; 16) of metal, reinforced synthetic material or the like, said protective tube surrounding at least one fiber tube (3; 13), said fiber tube containing at least one optical fiber (4; 14), wherein the cable comprises organs for venting the cable.

17 Claims, 3 Drawing Sheets

CABLE ARRANGEMENT

The present invention relates to a cable according to the preamble of claim 1.

BACKGROUND OF THE INVENTION

In the field of monitoring and/or controlling oil/gas wells, a cable may be positioned within or attached to the outside of the tubing. The cable extends from the wellhead to various communication nodes, sensors and actuators down hole. Cables of this kind must be able to withstand high temperatures, large hydrostatic pressures and an aggressive environment. In addition, the cable must withstand large mechanical pressures. Experience has shown that cables comprising an optical element, preferably optical fibers, are susceptible to attack by hydrogen from the surrounding environment, the hydrogen penetrating into the optical element, causing an attenuation increase and resulting in communication failure. Therefore, the optical element must be protected against in-diffusion of hydrogen. In the prior art this has been done according to at least one the following solutions:

- choosing fibers comprising glass materials which are insensitive to hydrogen in-diffusion,
- Use of a barrier of for example metal or carbon outside the fiber, so-called hermetic fibers,
- Use of specific materials, e.g. hydrogen scavenging greases, which capture/tie up free hydrogen,
- Using tube enclosures of metal or plastic that act as barriers preventing or delaying in-diffusion of hydrogen.

SUMMARY OF THE INVENTION

The present invention aims at protecting the optical element against the in-diffusion of hydrogen, possibly in combination with one or more of the above mentioned techniques.

This aim is reached by means of a cable according to the are mentioned in the dependent claims and the following description, by reference to the drawings, where:

DETAILED DESCRIPTION OF THE PREFERRED EMBODIMENTS

Figure 1:
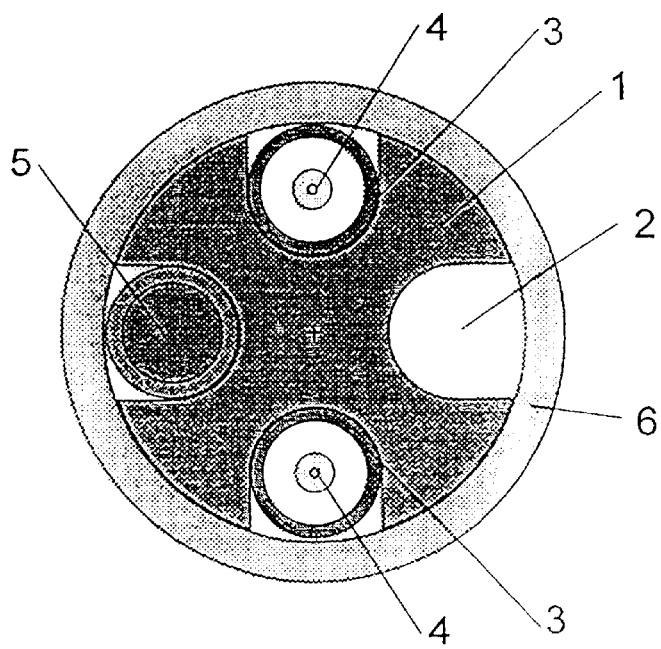
FIG. 1 shows a section of a cable according to a first embodiment of the present invention.

FIG. 1 shows a section of a cable comprising a metal core 1 provided with at least one groove 2 for the positioning of various elements. These elements may comprise at least one optical fiber 4 and/or insulated conductor 5.

The groove 2 may in addition to positioning of various elements be used for venting, either by using the groove 2 directly, or by positioning a separate tube in the groove.

The cable comprises a protective tube 6 of metal, reinforced synthetic material or the like.

Figure 2:
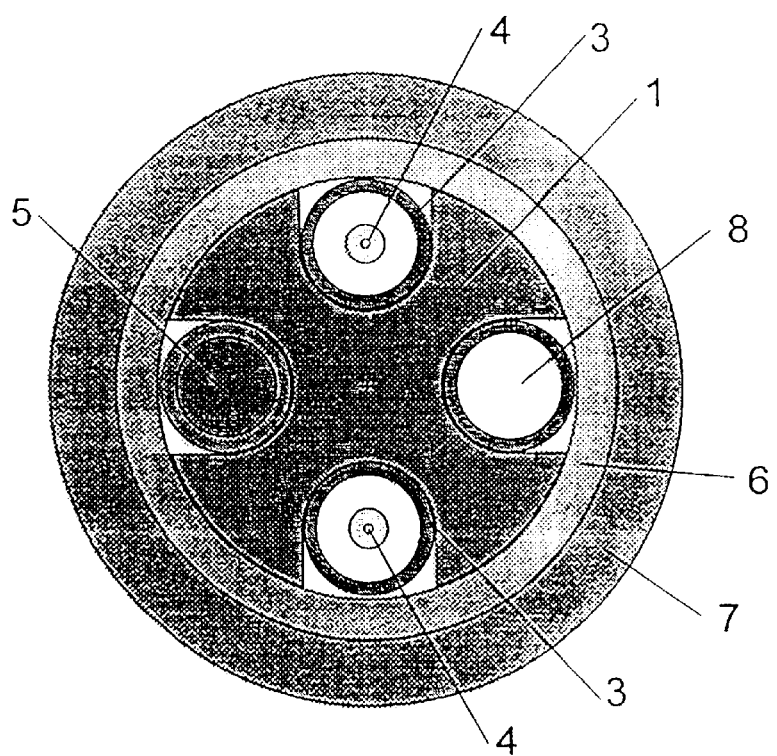
FIG. 2 shows a section of a cable according to a second embodiment of the present invention.

FIG. 2 shows a section of a cable corresponding to the one in FIG. 1, which in addition is provided with a sheath 7 comprising a temperature and chemically resistant polymer.

Figure 3:
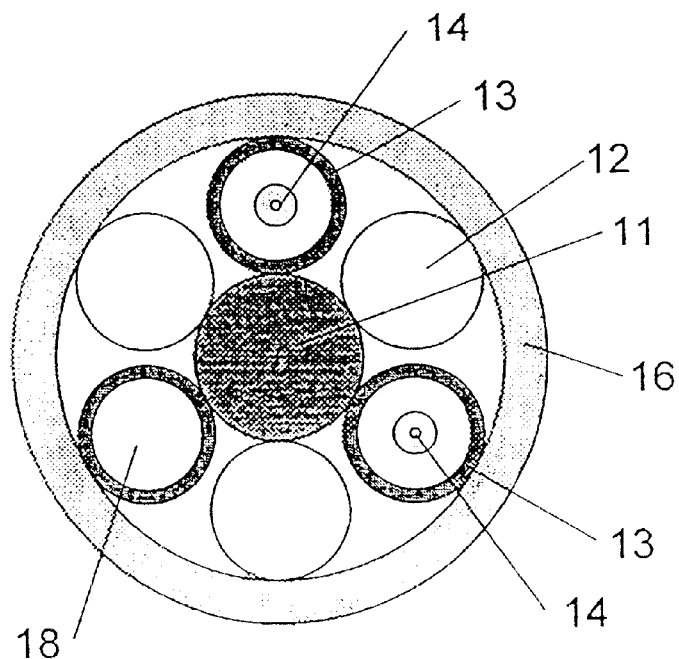
FIG. 3 shows a section of a cable according to a third embodiment of the present invention.

FIG. 3 shows a section of a cable with a stranded core. The core is build up around a central element 11, around which at least one tube 18 is stranded, the tube providing the cable venting organ. The central element 11 may be hollow and thereby also provide a venting organ, possibly in combination with said tube 18. The core comprises at least one tension element 12, in addition to at least one fiber element 13, which is provided with at least one fiber 14. The tension element 12 and the fiber element 13 are stranded in the same way as the venting organ. A protective tube 16 of metal, reinforced synthetic material or the like is provided around the core.

Figure 4:
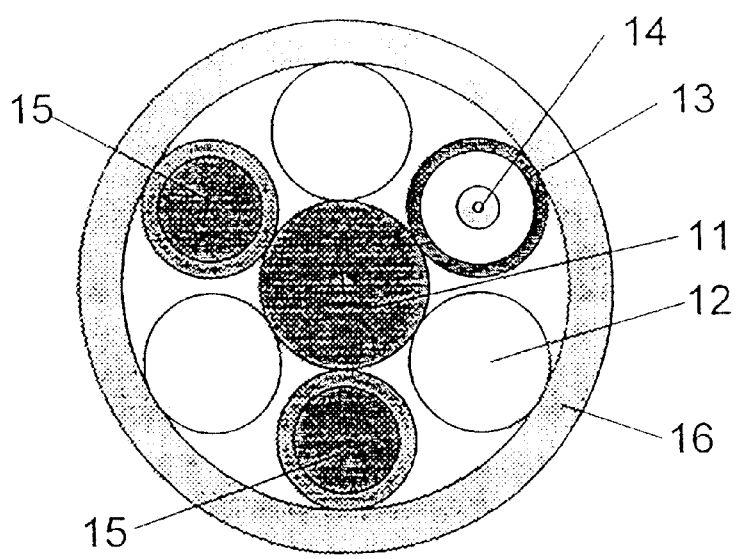
FIG. 4 shows a section of a cable according to a fourth embodiment of the present invention.

FIG. 4 shows a section of a cable with a stranded core corresponding to the cable in FIG. 3, comprising at least one insulated conductor 18.

Figure 5:
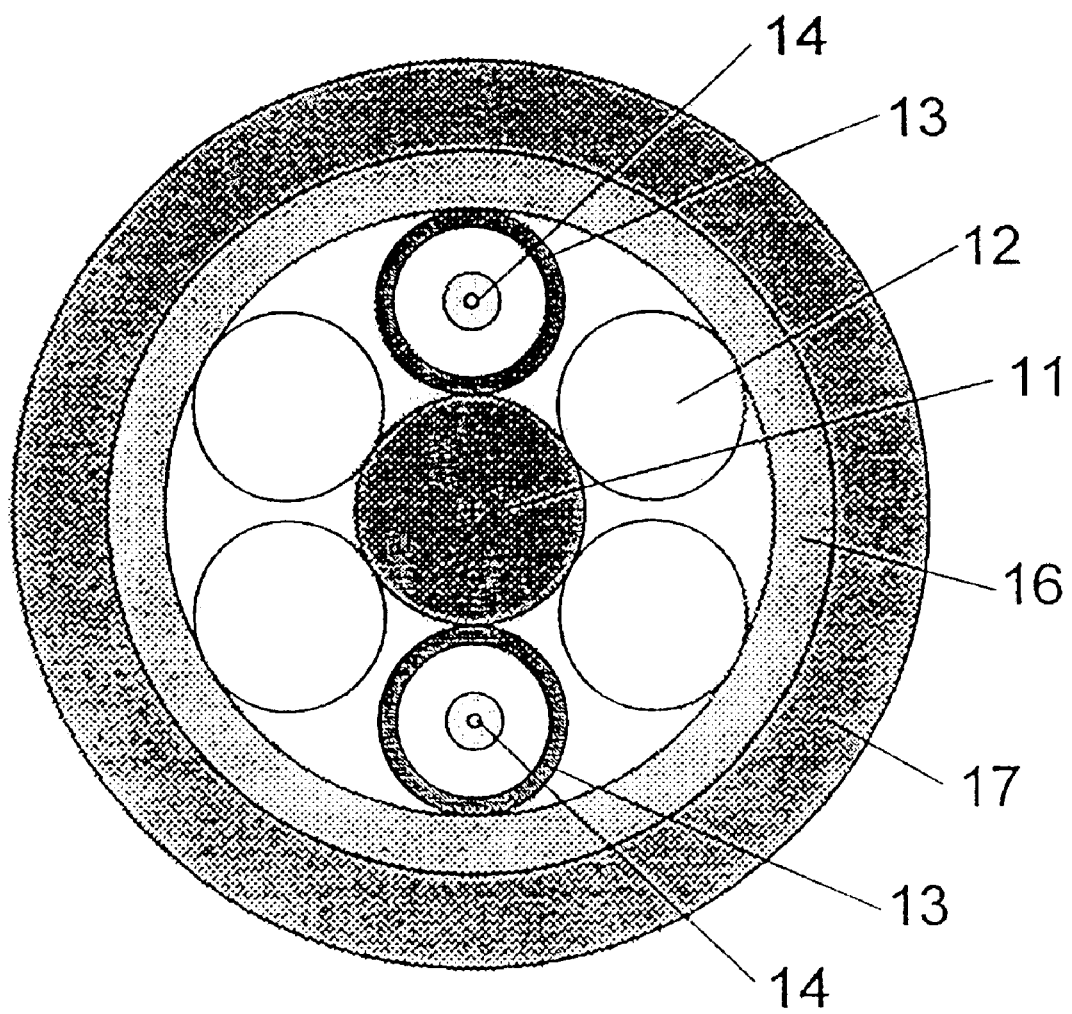
FIG. 5 shows a section of a cable according to a fifth embodiment of the present invention.

FIG. 5 shows a section of a cable corresponding to the cables in FIGS. 3 and 4, the outside of the tube 16 of protective metal, reinforced synthetic material or the like being provided with a sheath 17 of temperature and chemically resistant polymer.

This construction, comprising at least one gas filled cavity between the outer tube 6, 16 or the outer sheath 7, 17 and the central cable elements 1, 3, 5, 11, 12, 13, 18, enables transport of hydrogen before it diffuses into the cable elements comprising optical fiber 4, 14. Hydrogen is a light gas that will rise upwards without active help, i.e. passively.

Another solution is to vent out the hydrogen by pumping a suitable gas, e.g. nitrogen, through at least one insulated cavity 8, 18, the gas being led down to the bottom of the cable and thereafter displacing the unwanted gas in the cavity. The introduced gas rises through the cable between the core elements and vents out the hydrogen by pushing it upwards to the top of the cable (surface).

It is understood that the present invention easily may be used in combination with other techniques that prevent indiffusion of hydrogen, such as use of barriers of metal, carbon or grease. It is also understood that a skilled person by means of the specification, claims and/or drawings may conceive of various modifications and changes without departing from the scope and spirit of the present invention.

What is claimed is:

1. A cable, particularly for monitoring and/or controlling oil/gas wells, including a protective tube (6; 16) of metal, or reinforced synthetic material with minimal permeability to hydrogen, said protective tube surrounding at least one fiber tube (3; 13), said fiber tube containing at least one optical fiber (4; 14), interstices being formed between said protective tube and said fiber tube or tubes, the cable being arranged for passively venting off hydrogen in said interstices.

2. The cable recited in claim 1, wherein said fiber tube (3; 13) also is arranged to have minimal permeability to hydrogen.

3. The cable recited in claim 1, wherein said cable includes a central, strengthening element (1, 11).

4. The cable recited in claim 1, wherein the protective tube (6; 16) is covered by a sheath (7; 15) comprising a temperature and chemically resistant polymer.

5. A cable, particularly for monitoring and/or controlling oil/gas wells, including a protective tube (6; 16) of metal or reinforced synthetic material with minimal permeability to hydrogen, said protective tube surrounding at least one fiber tube (3; 13) and at least one venting tube (8; 18), said fiber tube containing at least one optical fiber (4; 14), said venting tube being arranged for passively venting off hydrogen diffusing into said cable.

6. The cable recited in claim 5, wherein said fiber tube (3; 13) also is arranged to have minimal permeability to hydrogen.

7. The cable recited in claim 6, said cable including a central, strengthening element (1; 11).

8. The cable recited in claim 7, wherein at least one venting tube (8; 18) is stranded around the central element (1; 11) together with said fiber tube (3; 13), the space between said central element (1; 11) and said fiber tube (3; 13) also providing channels that provide a venting effect.

9. The cable recited in 8, wherein the central element (1; 11) includes at least one hollow channel, said at least one hollow channel providing a venting organ (2), a channel for said venting tubes (8), and a channel for at least one insulated conductor (5).

10. The cable recited in claim 9, wherein the central element (1; 11) with its at least one hollow channel (2) extends out towards the protective tube (6), the central element (1; 11) comprising enough channels (2) to receive at least one fiber tube (3) and at least one venting organ (2; 8), at least one insulated conductor (15), the central element (1) comprising materials able to withstand tension and pressure.

11. A cable as claimed in claim 5, wherein the protective tube (6; 16) is covered by a sheath (7; 15) comprising a temperature and chemically resistant polymer.

12. A cable, particularly for monitoring and/or controlling oil/gas wells, including a protective tube (6; 16) of metal or reinforced synthetic material with minimal permeability to hydrogen, said protective tube surrounding at least one fiber tube (3; 13) and at least one venting tube (8; 18), said fiber tube containing at least one optical fiber (4; 14), said venting tube or tubes being arranged to receive a purging gas at one end, the gas returning via interstices formed between said protective tube and said fiber tube or tubes and said venting tube or tubes.

13. A cable as claimed in claim 12, wherein said fiber tube (3; 13) also is arranged to have minimal permeability to hydrogen.

14. A cable as claimed in claim 12, said cable including a central, strengthening element (1; 11).

15. A cable as claimed in claim 14, wherein the central element (1; 11) comprises at least one hollow channel, said at least one hollow channel providing a venting organ (2), a channel for said venting tubes (8), and a channel for at least one insulated conductor (5).

16. A cable as claimed in claim 15, wherein the central element (1; 11) with its at least one hollow channel (2) extends out towards the protective tube (6), the central element (1; 11) comprising enough channels (2) to receive at least one fiber tube (3) and at least one venting organ (2; 8), at least one insulated conductor (15), the central element (1) comprising materials able to withstand tension and pressure.

17. A cable as claimed in claim 12, wherein the protective tube (6; 16) is covered by a sheath (7; 15) comprising a temperature and chemically resistant polymer.

* * * * *